May 14, 1940.  T. ZINTSMASTER  2,201,070

ENGINE THROTTLE CONTROL

Filed Jan. 11, 1938

Tim Zintsmaster
INVENTOR

BY Victor J. Evans & Co.
ATTORNEYS

Patented May 14, 1940

2,201,070

UNITED STATES PATENT OFFICE 2,201,070

ENGINE THROTTLE CONTROL

Tim Zintsmaster, Cleveland Heights, Ohio

Application January 11, 1938, Serial No. 184,493

3 Claims. (Cl. 264—3)

The invention relates to a gas regulator and more especially to an attachment for motor vehicles in association with the accelerator pedal and carburetor.

The primary object of the invention is the provision of an attachment of this character, wherein the engine or motor of a motor vehicle can be assured the proper amount of gas according to its speed and on depressing the accelerator more than it should be for a given speed such as the heavy pull, quick get-away or hill climbing of the vehicle, the movement of the accelerator can be felt by the foot of the operator because of its pressure against a spring of the attachment although the accelerator can be depressed its entire length in its association with such attachment.

Another object of the invention is the provision of an attachment of this character, wherein the construction thereof is novel and the same is automatic in the working thereof.

A further object of the invention is the provision of an attachment of this character, which is extremely simple in construction, thoroughly reliable and effective in operation, automatic in action, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
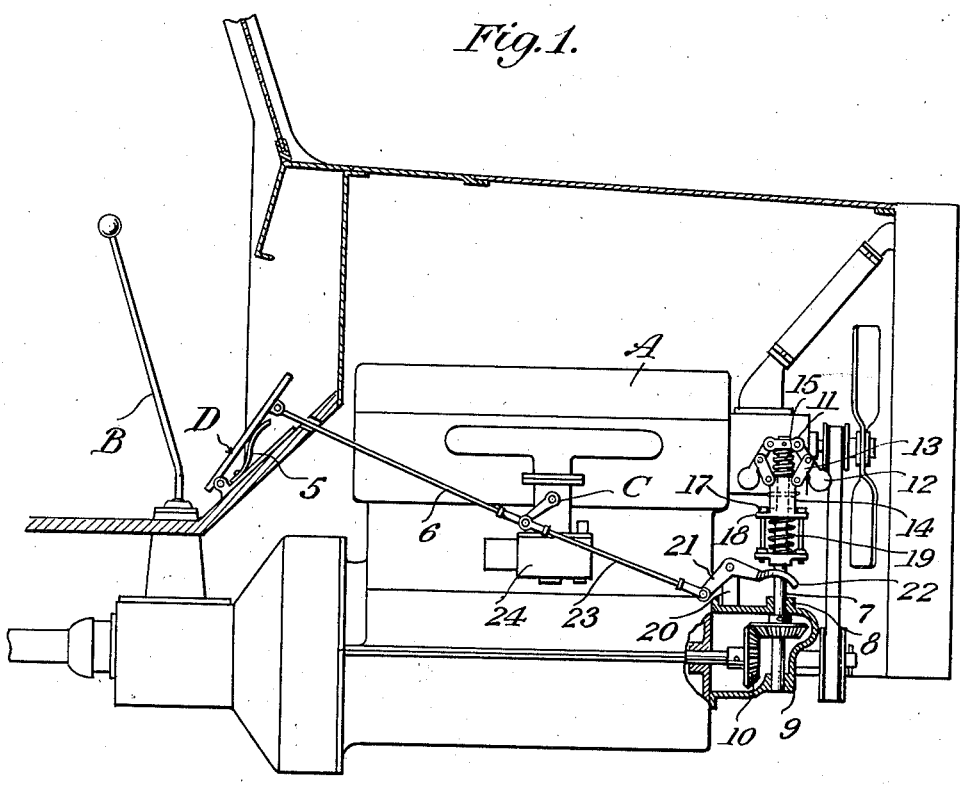
Figure 1 is a fragmentary elevation showing a motor vehicle engine or motor being partly in section and having the attachment constructed in accordance with the invention applied herewith.
Figure 2:
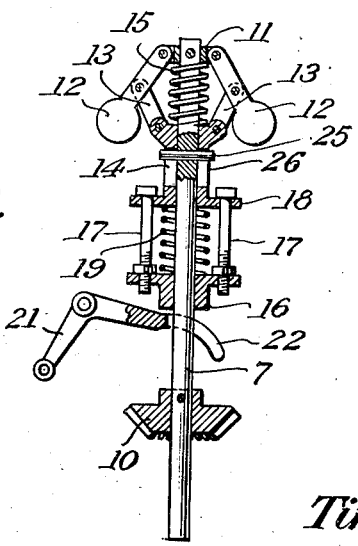
Figure 2 is an enlarged vertical sectional view through the attachment.

Referring to the drawing in detail, A designates generally a motor or engine for a motor vehicle, B the transmission lever, C the fuel intake control valve and D the accelerator pedal, respectively. This accelerator pedal has acting thereon a spring 5 which normally holds the same in full raised position while connecting said pedal with the control valve C is a push rod 6. In association with the engine or motor A the control valve C and the accelerator pedal D is the attachment constituting the present invention which comprises a vertically arranged rotatable governor shaft 7 disposed forwardly of the engine or motor block and suitably journaled in vertical position at 8 and 9, respectively, while through gearing connections 10 between said shaft 7 and the motor or engine A the said governor shaft 7 is rotated by the motor or engine.

Fixed to the upper end of the shaft 7 is a hanger 11 for centrifugally acting weighted governor arms 12, these through pivot links 13 being connected with a raising and lowering sleeve 14 slidably fitting the shaft 7. About the shaft 7 between the sleeve 14 and the hanger 11 is a coiled compression spring 15 which normally holds the governor arms 12 in lowered position. On the shaft 7 rotating at varying speeds the governor arms 12 will be raised compressing the spring 15.

Beneath the sleeve 14 and surrounding the shaft 7 is an abutment collar 16 being loosely linked by bolts 17 with the out-turned annular flange 18 on the lower end of the sleeve 14 while between the said collar and the sleeve 14 surrounding the shaft 7 is a coiled compression spring 19, being of less compression than the spring 15.

On the engine or motor A adjacent the shaft 7 is an upstanding bracket 20 having pivoted thereto a bell crank lever 21, its forwardly directed forked arm 22 straddling the shaft 7 beneath the collar 16, there being adjustable clearance between this arm 22 and said collar 16. The arm 22 acts upon the collar when the accelerator pedal D is depressed from its position as shown with the engine not operated. The other arm of the lever 21 through a coupling rod 23 had connection with the control valve C. The carburetor 24 as is usual is in communication with the intake manifold of the engine or motor.

The collar 16 moves up and down under the control of the governor according to the engine or motor speed, this collar moving upwardly as the engine or motor increases in speed and thus relieving pressure exerted through accelerator pedal D. The spring 19 allows the accelerator pedal D to be depressed to the full extent of the throw thereof by an operator of the vehicle and this pedal, as is conventional, actuates the control valve C of the carburetor 24 in association with the motor or engine A.

A pin 25 is passed transversely through the shaft 7 and also through slots 26 in the sleeve 14. The sleeve 14 is limited in its downward movement by the pin 25 which is rigidly fastened in the shaft 7 and passes through slots 26 in the said sleeve, said pin contacting with the upper ends of the slots 26 during normal inactive position. With this arrangement the sleeve can move freely upward as the speed of the governor increases, the length of the slots 26 being such that the pin will not contact with the bottom of the said slots.

In the operation of the attachment, while going up a hill, the pressure on the accelerator pedal D can be felt due to the arm 22 coming in contact with the abutment collar 16 providing the driver pushes pedal D down to attempt to rapidly accelerate the car. With the device hereinbefore described the operator can tell when he has depressed the accelerator pedal too far by pressure of the arm 22 against the collar 16 and thus effect a saving of gasoline.

The spring 19 allows the accelerator pedal D to be depressed to the full extent of the throw thereof by an operator of the vehicle and this pedal as is conventional actuates the control valve C of the carburetor 24 in association with the motor or engine A.

It is to be understood that I do not wish to be limited to the exact embodiment of my device as disclosed, for various other equivalents are possible without departing from the spirit of the invention or scope of the appended claims.

What is claimed is:

1. A speed responsive device for an engine having a throttle valve actuating means, comprising rotary means driven by the engine, speed responsive means actuated by said rotary means for offering a resistance to throttle control movement in the throttle opening direction within a low speed range of engine speeds and decreasing resistance to said throttle valve actuating means with increase in engine speed, and connections between the last named means and the said throttle valve actuating means.

2. A speed responsive device for an engine having a throttle valve actuating means, comprising rotary means driven by the engine, speed responsive means actuated by said rotary means for offering a resistance to throttle control movement in the throttle opening direction within a low speed range of engine speeds and decreasing resistance to said throttle valve actuating means with increase in engine speed, connections between the last named means and the said throttle valve actuating means, and a spring cooperating with the second named means and throttle valve actuating means.

3. A speed responsive device for an engine having a throttle valve actuating means, comprising a shaft driven by said engine, weighted arms rotating with said shaft and swingable relative thereto, a sleeve slidable on said shaft, a spring about said shaft between the sleeve and the point of connection of the arms with said shaft for tensioning the said arms, a flange on said sleeve, a compression spring surrounding said shaft and working against said sleeve, an abutment collar on the shaft and loosely linked to said flange for coacting with the compression spring, and means operative against the abutment collar and having connection with the throttle actuating means.

TIM ZINTSMASTER.